United States Patent [19]

Andrus et al.

[11] 4,341,543

[45] Jul. 27, 1982

[54] METHOD OF MAKING STRENGTHENED TRANSPARENT GLASS-CERAMIC, PARTIALLY BODY-CRYSTALLIZED, AND SURFACE-CRYSTALLIZED GLASS ARTICLES

[75] Inventors: Ronald L. Andrus, Elmira, N.Y.; Richard F. Reade, deceased, late of Corning, N.Y.; by Clara M. Reade, administratrix, Flushing, N.Y.

[73] Assignee: Corning Glass Works, Corning, N.Y.

[21] Appl. No.: 223,580

[22] Filed: Jan. 9, 1981

[51] Int. Cl.³ .......................... C03B 32/00; C03C 3/22
[52] U.S. Cl. .......................................... 65/30.1; 65/33
[58] Field of Search ....................... 65/30.1, 30.14, 33; 501/4

[56] References Cited

U.S. PATENT DOCUMENTS

| | | | |
|---|---|---|---|
| 1,973,501 | 9/1934 | Murgatroyd | 65/30.1 X |
| 3,451,796 | 6/1969 | Mochel | 65/30.14 X |
| 3,677,785 | 7/1972 | Horikawa | 65/33 X |
| 4,042,362 | 8/1977 | MacDowell et al. | 65/33 |

*Primary Examiner*—Richard V. Fisher
*Attorney, Agent, or Firm*—Clinton S. Janes, Jr.

[57] ABSTRACT

This invention is directed to means for producing strengthened, transparent glass-ceramic, partially body-crystallized, and surface-crystallized glass articles wherein beta-quartz solid solution constitutes the predominant crystal phase. The inventive method comprises subjecting a glass article consisting essentially, expressed in terms of weight percent, of about 2.5–6% $Li_2O$, 0.5–5% RO, wherein RO consists of ZnO and the alkaline earth metal oxides BaO, CaO, MgO, and SrO, 16–25% $Al_2O_3$, 64–73% $SiO_2$, and 3.0–6% $RO_2$, wherein $RO_2$ consists of 0–6% $TiO_2$ and 0–3.5% $ZrO_2$, to vapors of $SO_2$ and thereafter heat treating the glass article to cause crystallization in situ thereof.

5 Claims, No Drawings

METHOD OF MAKING STRENGTHENED TRANSPARENT GLASS-CERAMIC, PARTIALLY BODY-CRYSTALLIZED, AND SURFACE-CRYSTALLIZED GLASS ARTICLES

BACKGROUND OF THE INVENTION

Glass-ceramic articles, i.e., articles prepared through the controlled heat treatment of precursor glass articles which results in the crystallization in situ thereof, originated in U.S. Pat. No. 2,920,971. As explained in that disclosure, the production of glass-ceramic articles contemplates three general steps. First, a glass forming batch of a proper composition, and commonly containing a nucleating agent, is compounded and melted. Second, the melt is simultaneously cooled to a temperature below the transformation range and a glass article of a desired geometry shaped therefrom. Third, the glass article is exposed to a predetermined heat treatment which effects crystallization in situ of the glass article. Customarily, the heat treatment is accomplished in two steps. Hence, the glass article is initially heated to a temperature somewhat above the transformation range to cause the generation of nuclei and incipient crystallization in the parent glass body. Thereafter, the nucleated article is heated to a higher temperature, frequently at or above the softening point of the glass, to promote the growth of crystals on the nuclei.

Because the crystals are essentially simultaneously developed upon a multitude of nuclei present throughout the precursor glass body, the glass-ceramic article conventionally consists of relatively uniformly-sized, fine-grained crystals homogeneously dispersed within a glass matrix, the crystal phase commonly constituting the predominant proportion of the article. U.S. Pat. No. 2,920,971 provides a much more complete review of the microstructure of glass-ceramic bodies and the manner in which they are made. Accordingly, reference is made to that patent for further discussion of those points. As can be understood therefrom, the crystal phases generated in glass-ceramic articles are dependent both upon the composition of the precursor glass and the heat treatment applied thereto.

Whereas the majority of the glass-ceramic products which have been prepared has exhibited an opaque appearance, various workers have described transparent, highly-crystalline, glass-ceramic articles. The crystal phases present in such articles have demonstrated very low birefringence, and/or indices of refraction substantially matching that of the residual glassy matrix, and/or extremely fine crystal sizes. The crystal phase most prevalent in transparent glass-ceramics has been termed beta-quartz solid solution. U.S. Pat. No. 3,252,811 is illustrative of such products and provides a rather detailed discussion of the composition and microstructure of beta-quartz solid solution crystals.

Because of the extensive crystallization present in glass-ceramic articles, the mechanical strengths demonstrated by those articles are customarily somewhat greater than those displayed by the parent glass body. Nevertheless, considerable research has been expended in developing means for improving the mechanical strengths of glass-ceramic articles and numerous schemes have been proposed for accomplishing that purpose.

Various ion exchange techniques are described in such U.S. Pat. Nos. as 3,585,053, 3,585,054, and 3,585,055. In certain instances (U.S. Pat. Nos. 3,585,053 and 3,585,055), the identity of the crystals in the surface of the glass-ceramic is unaffected by the ion exchange, but compressive stresses are set up in a surface layer on the article. In other instances, exemplified by U.S. Pat. No. 3,585,054, the identity of the surface crystals is changed, the new crystals having a lower coefficient of thermal expansion thereby creating an integral surface compression layer in the article. U.S. Pat. No. 3,637,453 discloses first exposing a glass-ceramic article to an ion exchange reaction and thereafter thermally tempering the body. U.S. Pat. No. 3,931,438 teaches the manufacture of strengthened glass-ceramic articles by forming a laminated composite body wherein the core portion has a different composition from that of the skin layers. The compositions are so chosen that, when the precursor or laminated glass body is crystallized, the skin layers densify to a lesser extent than the core. Surface compressive stresses are set up because of the greater volume shrinkage of the core glass-ceramic with respect to the glass-ceramic skin.

Articles demonstrating mechanical strengths superior to those exhibited by glass or glass-ceramic bodies have been prepared consisting of an internal or core portion of glass and a crystallized surface layer. U.S. Pat. No. 3,253,975 is illustrative of that practice and describes heat treating a glass body of a particular composition to generate a crystalline surface layer thereon, the crystals displaying a lower coefficient of thermal expansion than the glass. This established a uniform compressive stress in the surface layer which led to a significant increase in the mechanical strength of the body.

Each of those methods is limited to specific composition areas for which each is operable. Moreover, the patented methods involve complex machinations and expensive equipment, e.g., baths of molten salts for ion exchange reactions, and/or very carefully controlled heat treatments to generate the desired surface crystallization, and/or complicated forming techniques to produce laminated articles. Accordingly, it would be highly desirable to devise a rapid, relatively inexpensive method for strengthening glass-ceramic and surface-crystallized glass articles.

U.S. Pat. No. 1,973,501 discloses the strengthening of soda lime glass articles by exposing such to temperatures at or somewhat below the softening point of the glass in an atmosphere containing vapors of sulfur dioxide ($SO_2$) or sulfur trioxide ($SO_3$). Those vapors react with the $Na_2O$ in the glass surface to form $Na_2SO_3$ or $Na_2SO_4$. Those compounds are stated to flux the glass surface slightly so as to round off the minute flaws inherently present in the glass surface. This practice improves the weathering resistance and mechanical strength of the glass.

SUMMARY OF THE INVENTION

The instant invention is founded in the discovery that strong (abraded modulus of rupture values in excess of 20,000 psi), transparent glass-ceramic, partially body-crystallized, and surface-crystallized glass articles, wherein beta-quartz solid solution constitutes the predominant crystal phase, can be prepared from glass compositions in the $Li_2O$-RO-$Al_2O_3$-$SiO_2$-$RO_2$ system, wherein RO is selected from the group of the alkaline earth metal oxides BaO, CaO, MgO, and SrO and ZnO and $RO_2$ is selected from the group of $TiO_2$ and $ZrO_2$, which are subjected to vapors of $SO_2$ at temperatures at or somewhat below the softening point of the glass prior to heat treating the precursor glass body to cause crystallization in situ. The inventive method comprehends five general steps:

First, a batch for a glass consisting essentially, expressed in weight percent on the oxide basis, of about 2.5–6% $Li_2O$, 0.5–5% RO, 16–25% $Al_2O_3$, 64–73% $SiO_2$, and 3.0–6% $RO_2$, wherein $RO_2$ consists of 0–6% $TiO_2$ and 0–3.5% $ZrO_2$, is melted;

Second, the melt is simultaneously cooled to a temperature at least below the transformation range thereof and a glass article of a desired configuration shaped therefrom;

Third, the glass article is exposed to vapors of $SO_2$ at a temperature between the annealing point and softening point of the glass for a period of time sufficient to cause a reaction in the surface of the glass to occur between $Li^+$ ions and $SO_2$ vapors to form a deposit of $Li_2SO_3$ and/or $Li_2SO_4$ on the glass surface;

Fourth, the deposit of $Li_2SO_3$ and/or $Li_2SO_4$ is removed from the glass surface; and then Fifth, the glass article is heated to a temperature between 750°–1000° C. for a period of time sufficient to cause the crystallization in situ of beta-quartz solid solution, the period of time being determined by the desire to form a glass-ceramic, a partially body-crystallized article, or a surface-crystallized glass article.

As is well-recognized in the art, the rate of reaction between $Li^+$ ions in the glass surface and $SO_2$ vapors, and the depth of the reaction layer formed are a function of temperature. Hence, the reaction takes place more rapidly as the temperature is raised. In like manner, the rate of crystallization and the total amount of crystallization generated is directly dependent upon the temperature of heat treatment. Consequently, an exposure period to $SO_2$ vapors of no more than about 0.25 hour may be sufficient at the softening point of the glass to develop the desired reaction layer having a depth of at least 0.002". In contrast, an exposure time of two hours and longer may be required to produce the desired reaction layer at the annealing point of the glass. Likewise, crystallization times to yield glass-ceramic bodies can range from no more than about 0.25 hour at 1000° C. to six hours and more at 750° C. Much longer periods are possible at the lower extreme of the crystallization range with no deleterious effect upon the crystallization, e.g., 24 hours or even longer. However, such longer times are not commercially attractive and the crystallization is not significantly improved thereby.

As can be appreciated, the production of surface-crystallized glass articles utilizes relatively short heat treatment periods. Thus, times ranging from a few minutes to an hour will frequently suffice. The development of partially body-crystallized articles will, self-evidently, demand heat treating times intermediate those required for glass-ceramics and surface-crystallized glass articles.

The inventive glass-ceramic products demonstrate a coefficient of thermal expansion (0°–600° C.) of less than $10 \times 10^{-7}$/°C. while the thermal expansion of the surface-crystallized glasses is about $40 \times 10^{-7}$/°C., i.e., approximately that of the untreated glass [$40-45 \times 10^{-7}$/°C.]. The coefficient of thermal expansion of the partially body-crystallized articles will obviously range between that of the glass-ceramic and that of the surface-crystallized glass and will be a function of the amount of crystallization present within the volume of the product. (As defined herein, a glass-ceramic article is deemed to be greater than 50% by volume crystalline. The inventive glass-ceramics are generally highly crystalline, viz., greater than 75% by volume crystalline.)

To insure more uniformly fine-grained crystallization, the preferred heat treatment procedure contemplates two steps. The glass body is initially exposed to a temperature at or somewhat above the transformation range for a sufficient length of time to induce good nucleation. Subsequently, the glass article is heated to a higher temperature, frequently above the softening point, to grow crystals on the sites provided by the nuclei. For example, the glass article will be first heated to about 650°–750° C. for about 0.25–4 hours to promote nucleation and then raised to 750°–1000° C. to effect crystallization.

The maximum crystallization temperature ought not to exceed about 1000° C. since higher temperatures cause the beta-quartz solid solution crystals to be transformed into beta-spodumene solid solution crystals. That transformation appears to yield a product exhibiting essentially no increase in strength.

Related Application

U.S. Application Ser. No. 223,579, Surface Treatment of Chemically-Machinable Glass-Ceramic Articles, filed concurrently herewith in the name of Herbert E. Rauscher, discloses means for preventing the sticking of photothermally crystallizable, chemically-machinable, glass-ceramic articles to various substrate materials. The articles utilize a photosensitive metal to nucleate crystallization and the inventive method contemplates contacting the fully crystallized articles with $SO_2$ vapors at elevated temperatures to dealkalize the surface thereof.

DESCRIPTION OF THE PREFERRED EMBODIMENTS

Table I records compositions of glasses, expressed in terms of parts by weight on the oxide basis, which are illustrative of the parameters of the present invention. Inasmuch as the sum of the several components totals or approximately totals 100, for all practical purposes the recited values may be considered to reflect weight percent. Because it is not known with which cation the fluorine is combined, it is merely reported as fluoride in accordance with conventional glass analysis practice. The actual ingredients of the glass batches may consist of any materials, either the oxides or other compounds, which, when melted together, will be converted into the desired oxides in the proper proportions.

The batch constituents were compounded, ballmilled together to assist in obtaining a homogeneous melt, and placed into platinum crucibles. After covering, the crucibles were moved to a furnace operating at about 1650° C., and the batches melted for 16 hours. One quarter inch diameter glass cane was hand drawn from each melt and the remainder of the melt poured onto a steel plate, the resulting slab being transferred immediately to an annealer operating at 650° C. $As_2O_3$ was included in the batches to perform its customary function as a fining agent.

TABLE I

|  | 1 | 2 | 3 | 4 | 5 | 6 | 7 |
|---|---|---|---|---|---|---|---|
| $SiO_2$ | 68.0 | 67.3 | 67.5 | 66.1 | 67.2 | 67.6 | 67.0 |
| $Al_2O_3$ | 20.3 | 20.1 | 20.1 | 19.7 | 20.1 | 20.2 | 20.0 |
| $Li_2O$ | 4.3 | 3.7 | 3.7 | 3.6 | 3.7 | 4.5 | 4.8 |

TABLE I-continued

|     | 1 | 2 | 3 | 4 | 5 | 6 | 7 |
|---|---|---|---|---|---|---|---|
| TiO$_2$ | 5.0 | 5.0 | 2.4 | 4.9 | 5.0 | 5.0 | 5.0 |
| ZrO$_2$ | — | — | 2.5 | — | — | — | — |
| MgO | 1.8 | 1.8 | 1.8 | 1.7 | — | — | — |
| ZnO | — | 1.5 | 1.5 | 1.5 | — | — | — |
| CaO | — | — | — | — | 1.4 | 2.1 | — |
| SrO | — | — | — | — | — | — | 2.6 |
| F | — | — | — | — | 0.5 | — | — |
| Na$_2$O | — | — | — | 2.0 | 2.0 | — | — |

|     | 8 | 9 | 10 | 11 | 12 | 13 | 14 |
|---|---|---|---|---|---|---|---|
| SiO$_2$ | 65.1 | 65.5 | 66.1 | 66.1 | 66.9 | 67.2 | 67.8 |
| Al$_2$O$_3$ | 22.2 | 22.3 | 20.0 | 20.0 | 20.5 | 20.3 | 19.9 |
| Li$_2$O | 4.1 | 4.1 | 3.7 | 3.7 | 3.5 | 3.7 | 4.1 |
| TiO$_2$ | 1.6 | 1.7 | 4.9 | 4.9 | 4.8 | 5.0 | 5.0 |
| ZrO$_2$ | 2.5 | 2.5 | — | — | 0.2 | — | — |
| MgO | 1.6 | 2.2 | 2.0 | 2.0 | 1.6 | 2.0 | 1.6 |
| ZnO | 2.2 | 1.1 | 1.0 | 1.0 | 1.2 | 1.0 | 0.8 |
| F | — | — | 0.1 | 0.3 | 0.2 | — | — |
| Na$_2$O | — | — | 1.6 | 1.6 | 0.2 | — | — |
| K$_2$O | — | — | — | — | 0.2 | — | — |
| V$_2$O$_5$ | — | — | — | — | 0.1 | — | — |
| As$_2$O$_3$ | 0.5 | 0.5 | 0.7 | 0.7 | 0.4 | 0.7 | 0.8 |

|     | 15 | 16 | 17 | 18 | 19 | 20 | 21 |
|---|---|---|---|---|---|---|---|
| SiO$_2$ | 68.0 | 68.0 | 68.6 | 69.0 | 69.3 | 69.1 | 66.9 |
| Al$_2$O$_3$ | 20.3 | 20.6 | 18.6 | 18.7 | 18.7 | 20.9 | 20.3 |
| Li$_2$O | 4.3 | 5.2 | 3.3 | 3.7 | 3.7 | 4.2 | 4.4 |
| TiO$_2$ | 5.1 | 2.4 | 4.1 | 3.8 | 4.7 | — | 2.4 |
| ZrO$_2$ | — | 2.5 | 1.6 | 1.5 | 0.8 | 3.1 | 2.4 |
| MgO | 1.8 | 0.5 | 1.9 | 1.5 | 1.5 | 2.1 | — |
| ZnO | — | — | 1.0 | 0.8 | — | — | 3.0 |
| F | — | — | — | 0.2 | — | — | — |
| Na$_2$O | — | — | 0.3 | 0.3 | 0.3 | — | — |
| K$_2$O | — | — | 0.2 | 0.2 | 0.2 | — | — |
| As$_2$O$_3$ | 0.5 | 0.7 | 0.5 | 0.7 | 0.7 | 0.5 | 0.5 |

|     | 22 | 23 | 24 | 25 | 26 | 27 | 28 | 29 |
|---|---|---|---|---|---|---|---|---|
| SiO$_2$ | 68.2 | 64.5 | 66.8 | 66.1 | 72.8 | 67.1 | 66.9 | 69.8 |
| Al$_2$O$_3$ | 20.4 | 24.4 | 20.2 | 20.0 | 16.5 | 10.0 | 20.0 | 17.8 |
| Li$_2$O | 3.8 | 4.3 | 4.4 | 4.4 | 3.6 | 3.0 | 2.6 | 2.6 |
| TiO$_2$ | 1.8 | 2.3 | 2.4 | 2.4 | 2.4 | 2.4 | 2.4 | 1.6 |
| ZrO$_2$ | 1.9 | 2.4 | 2.4 | 2.4 | 2.5 | 2.5 | 2.4 | 2.5 |
| MgO | 1.8 | 1.4 | 1.0 | — | 1.2 | 2.4 | 2.8 | 2.3 |
| ZnO | 1.5 | — | — | — | — | 2.1 | 2.4 | 1.9 |
| BaO | — | — | 1.9 | — | — | — | — | — |
| La$_2$O$_3$ | — | — | — | 4.0 | — | — | — | — |
| As$_2$O$_3$ | 0.5 | 0.7 | 0.7 | 0.7 | 0.8 | 0.5 | 0.5 | 0.9 |

As can be seen from Table I, various extraneous materials may optionally be included in the glass compositions to improve the melting and forming character of the glass and/or to modify the physical properties thereof. However, the total of all such additions ought not to exceed about 5% by weight. Moreover, the sum of the alkali metal oxides (other than Li$_2$O) will most preferably be held below about 2% to forestall the development of crystal phases other than beta-quartz solid solution. Also, because of the extensive fluxing action of fluorine, its presence will also be limited to a maximum of about 2%.

The glass samples were introduced into a tube furnace operating at the temperatures reported in Table II and exposed for the periods reported in Table II to a flowing mixture of 2% by volume SO$_2$ in air which had been bubbled through water at 95° C. The specimens were thereafter removed from the furnace, cooled to room temperature, rinsed in tap water to remove the sulfite and/or sulfate "bloom", dried, and moved to a furnace to effect crystallization in situ following the heat treatment schedules delineated in Table II.

Table II also lists coefficients of thermal expansion (Coef. Exp.) over the range of 0°–600° C. in terms of ×10$^{-7}$/°C. and modulus of rupture values (MOR) measured on tumble abraded or sandblasted cane samples or one quarter inch cross section stress bars cut from the glass slabs. The samples were abraded to simulate the mechanical abuse received by glass and glass-ceramic bodies when in use.

Each final product was transparent, sometimes with a slight yellowish cast, and X-ray diffraction analyses indicated beta-quartz solid solution to be essentially the sole crystal phase present.

TABLE II

| Example | SO$_2$ Treatment | Crystallization Treatment | MOR | Coef. Exp. |
|---|---|---|---|---|
| 1 | 650° C. for 1 hour | Heat 300° C./hour to 850° C. Hold at 850° C. for 1 hour | 56,000 psi | — |
| 2 | 650° C. for 1 hour | Heat 300° C./hour to 850° C. Hold at 850° C. for 1 hour | 44,100 psi | 8 |
| 2A | 600° C. for 0.5 hour | Heat at 250° C./hour to 850° C. Hold at 850° C. for 0.5 hour | 30,200 psi | 8 |
| 2B | None | Heat at 300° C./hour to 650° C. Hold at 650° C. for 1 hour | 8,360 psi | 6 |
| 3 | 650° C. for 1 hour | Heat 300° C./hour to 850° C. Hold at 850° C. for 1 hour | 58,900 psi | 0 |
| 3A | 600° C. for 0.5 hour | Heat at 250° C./hour to 850° C. Hold at 850° C. for 0.5 hour | 31,700 psi | — |
| 3B | None | Heat at 300° C./hour to 650° C. Hold at 650° C. for 1 hour Heat at 250° C./hour to 850° C. Hold at 850° C. for 0.5 hour | 10,340 psi | 4 |
| 4 | 650° C. for 1 hour | Heat 300° C./hour to 850° C. Hold at 950° C. for 1 hour | 28,600 psi | 10 |
| 5 | 650° C. for 1 hour | Heat 300° C./hour to 850° C. Hold at 850° C. for 1 hour | 20,100 psi | 8 |
| 6 | 650° C. for 1 hour | Heat 300° C./hour to 850° C. Hold at 850° C. for 1 hour | 45,400 psi | −1 |
| 7 | 650° C. for 1 hour | Heat 300° C./hour to 850° C. Hold at 850° C. for 1 hour | 39,300 psi | −2 |
| 8 | 650° C. for 1 hour | Heat 300° C./hour to 700° C. Hold at 700° C. for 1 hour Heat 300° C./hour to 800° C. Hold at 800° C. for 1 hour | 55,500 psi | 16 |
| 9 | 650° C. for 1 hour | Heat 300° C./hour to 700° C. Hold at 700° C. for 1 hour Heat 300° C./hour to 800° C. Hold at 800° C. for 1 hour | 59,400 psi | 33 |

TABLE II-continued

| Example | SO₂ Treatment | Crystallization Treatment | MOR | Coef. Exp. |
|---|---|---|---|---|
| 10 | 625° C. for 0.25 hr. | Heat 300° C./hour to 700° C. Hold at 700° C. for 1 hour Heat 100° C./hour to 800° C. Hold at 800° C. for 0.5 hour | 66,280 psi | 15 |
| 11 | 625° C. for 0.25 hr. | Heat 300° C./hour to 700° C. Hold at 700° C. for 1 hour Heat 100° C./hour to 800° C. Hold at 800° C. for 0.5 hour | 56,340 psi | — |
| 12 | 650° C. for 1 hour | Heat 300° C./hour to 775° C. Hold at 775° C. for 1 hour | 30,400 psi | 40 |
| 13 | 650° C. for 1 hour | Heat 300° C./hour to 700° C. Hold at 700° C. for 1 hour Heat 300° C./hour to 800° C. Hold at 800° C. for 1 hour | 49,800 psi | 26 |
| 14 | 650° C. for 1 hour | Heat 300° C./hour to 700° C. Hold at 700° C. for 1 hour Heat 300° C./hour to 800° C. Hold at 800° C. for 1 hour | 59,840 psi | 32 |
| 15 | 600° C. for 0.25 hr. | Heat 250° C./hour to 850° C. Hold at 850° C. for 0.5 hour | 46,900 psi | 16 |
| 16 | 500° C. fo 0.5 hr. | Heat 250° C./hour to 800° C. Hold at 800° C. for 0.5 hour | 29,600 psi | 42 |
| 17 | 650° C. for 1 hour | Heat 300° C./hour to 700° C. Hold at 700° C. for 1 hour Heat 125° C./hour to 850° C. Hold at 850° C. for 0.5 hour | 42,640 psi | 13 |
| 18 | 625° C. for 0.25 hr. | Heat 300° C./hour to 700° C. Hold at 700° C. for 1 hour Heat 100° C./hour to 800° C. Hold at 800° C. for 0.5 hour | 36,840 psi | 14 |
| 19 | 625° C. for 0.25 hr. | Heat 300° C./hour to 700° C. Hold at 700° C. for 1 hour Heat 100° C./hour to 800° C. Hold at 800° C. for 0.5 hour | 41,860 psi | 16 |
| 20 | 625° C. for 0.5 hr. | Heat 30° C./hour to 700° C. No hold Heat 150° C./hour to 850° C. Hold at 850° C. for 1 hour | 79,900 psi | 0 |
| 21 | 625° C. for 0.5 hr. | Heat 200° C./hour to 800° C. Hold at 800° C. for 0.5 hour | 60,200 psi | 33 |
| 22 | 650° C. for 1 hour | Heat at 250° C./hour to 850° C. Hold at 850° C. for 0.5 hour | 47,900 | 1 |
| 23 | 600° C. for 0.25 hr. | Heat 250° C./hour to 850° C. Hold at 850° C. for 0.5 hour | 36,100 psi | −6 |
| 24 | 600° C. for 0.25 hr. | Heat 250° C./hour to 850° C. Hold at 850° C. for 0.5 hour | 40,800 psi | — |
| 25 | 700° C. for 2 hrs. | Heat 250° C./hour to 850° C. Hold at 850° C. for 0.5 hour | 71,700 psi | 34 |
| 26 | 600° C. for 0.25 hr. | Heat 300° C./hour to 900° C. Hold at 900° C. for 0.5 hour | 27,200 psi | −13 |
| 27 | 700° C. for 2 hrs. | Heat 250° C./hour to 850° C. Hold at 850° C. for 0.5 hour | 42,000 psi | 3 |
| 28 | 650° C. for 1 hr. | Heat 300° C./hour to 650° C. No hold Heat 100° C./hour to 850° C. Hold at 850° C. for 0.5 hour | 22,600 psi | 11 |
| 29 | 650° C. for 2 hrs. | Heat 300° C./hr to 750° C. Hold at 750° C. for 0.5 hour Heat 300° C./hour to 850° C. Hold at 850° C. for 0.5 hour | 47,500 psi | 17 |

Examples 2 and 3 of Table II clearly illustrate the substantive effect upon mechanical strength which the SO₂ treatment imparts. Also, as can be observed through a study of Table II, the mechanical strengths demonstrated by the surface-crystallized glasses (Examples 12 and 16) are generally less than those exhibited by the body-crystallized articles. The mechanism of strengthening is not fully understood although it is believed that the SO₂ treatment induces the rapid growth of beta-quartz solid solution crystallization on the surface of the glass body while the interior remains vitreous. Additionally, the SO₂ contact dealkalizes the glass surface by means of a $H^+$-for-$Li^+$ ion exchange reaction. Thus, the reaction taking place between moist SO₂ and lithium-containing glass surface can be generally expressed as:

$$\text{Glass} + \text{Moist SO}_2 \xrightarrow{\text{heat}} \text{Protonated Glass Surface} + \text{Bloom} \quad \text{I}$$
$$(\text{Li}_2\text{SO}_4)$$

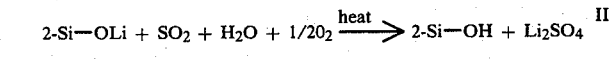

$$2\text{-Si}-\text{OLi} + \text{SO}_2 + \text{H}_2\text{O} + 1/2\text{O}_2 \xrightarrow{\text{heat}} 2\text{-Si}-\text{OH} + \text{Li}_2\text{SO}_4 \quad \text{II}$$

The reaction delineated in Equation II was hypothesized to be equivalent on a weight percent basis to the addition of H₂SO₄ to the glass. Hence:

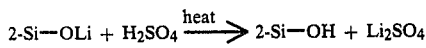

To test out the validity of that hypothesis, the weight gain of "$H_2SO_4$" during the $SO_2$ treatment and the weight loss of $Li_2SO_4$ occurring via the removal of the bloom from the glass surface were measured. The test results confirmed the postulated one-for-one $H^+$-for-$Li^+$ ion exchange reaction.

During the subsequent crystallization treatment to obtain a transparent glass-ceramic body containing beta-quartz solid solution crystals, the initially crystallized, rigid surface is put into compression as the interior portion of the body undergoes a volume shrinkage resulting from the crystallization of beta-quartz solid solution taking place therein. This action can be deemed a manifestation of the known differential density strengthening phenomenon.

Where a surface-crystallized glass article is desired, the crystallization heat treatment is carried out only for a period of time sufficient to yield a highly crystalline surface layer while leaving the interior in the glassy state. Upon cooling of the body, the rigid, low expansion surface is put into compression via the contraction of the higher expansion glass interior.

The strengthening mechanism operating in the partially body-crystallized articles is believed to involve a combination of the differential density and the differential expansion phenomena.

However, that the $SO_2$ treatment imports a truly significant increase in strength to the inventive glasses is unequivocally demonstrated in the three treatments applied to Examples 2 and 3, as reported in Table II. Thus, those two compositions exhibited high modulus of rupture levels after substantial exposures to $SO_2$ vapors. Milder $SO_2$ treatments, as manifested in heat treatments 2A and 3A, provide some strengthening, but obviously of lower magnitude. Heat treatments 2B and 3B, utilizing temperatures equivalent to heat treatments 2, 2A, 3, and 3A but omitting the presence of $SO_2$, evidence no strengthening effect.

Our most preferred exemplary composition is Example 2.

We claim:

1. A method for making a transparent glass-ceramic, partially body-crystallized, or surface-crystallized glass article exhibiting an abraded modulus of rupture value in excess of 20,000 psi, wherein beta-quartz solid solution constitutes the predominant crystal phase, which comprises the steps of:
    (a) melting a batch for a glass consisting essentially, expressed in terms of weight percent on the oxide basis, of about 2.5–6% $Li_2O$, 0.5–5% RO, wherein RO consists of BaO, CaO, MgO, SrO, and ZnO, 16–25% $Al_2O_3$, 64–73% $SiO_2$, and 3.0–6% $RO_2$, wherein $RO_2$ consists of 0–6% $TiO_2$ and 0–3.5% $ZrO_2$;
    (b) simultaneously cooling the melt to a temperature at least below the transformation range thereof and forming a glass article of a desired configuration therefrom;
    (c) exposing the glass article to vapors of $SO_2$ at a temperature between the annealing point and the softening point of the glass for a period of time sufficient to cause a reaction to occur to a depth of at least 0.002" in the surface of the glass between $Li^+$ ions and $SO_2$ vapors to form a deposit of $Li_2SO_3$ and/or $Li_2SO_4$ thereon;
    (d) removing the deposit of $Li_2SO_3$ and/or $Li_2SO_4$ from the glass surface; and
    (e) heating the glass article to a temperature between 750°–1000° C. for a period of time sufficient to cause the crystallization in situ of beta-quartz solid solution to form a glass-ceramic article, a partially body-crystallized article, or a surface-crystallized glass article.

2. A method according to claim 1 wherein said glass article is exposed to $SO_2$ vapors for about 0.25–2 hours.

3. A method according to claim 1 wherein said glass article is heated between 750°–1000° C. for a time ranging from a few minutes to one hour to produce a surface-crystallized glass article.

4. A method according to claim 1 wherein said glass article is heated between 750°–1000° C. for a time ranging between 0.25–6 hours to produce a glass-ceramic article.

5. A method according to claim 1 wherein said glass article is heated between 650°–750° C. for about 0.25–4 hours to promote nucleation prior to being heated to 750°–1000° C.

* * * * *